April 9, 1968     EIICHI TAKANO     3,377,119
MECHANICALLY COMPENSATED ZOOM LENS SYSTEM
Filed Dec. 30, 1963     2 Sheets-Sheet 1
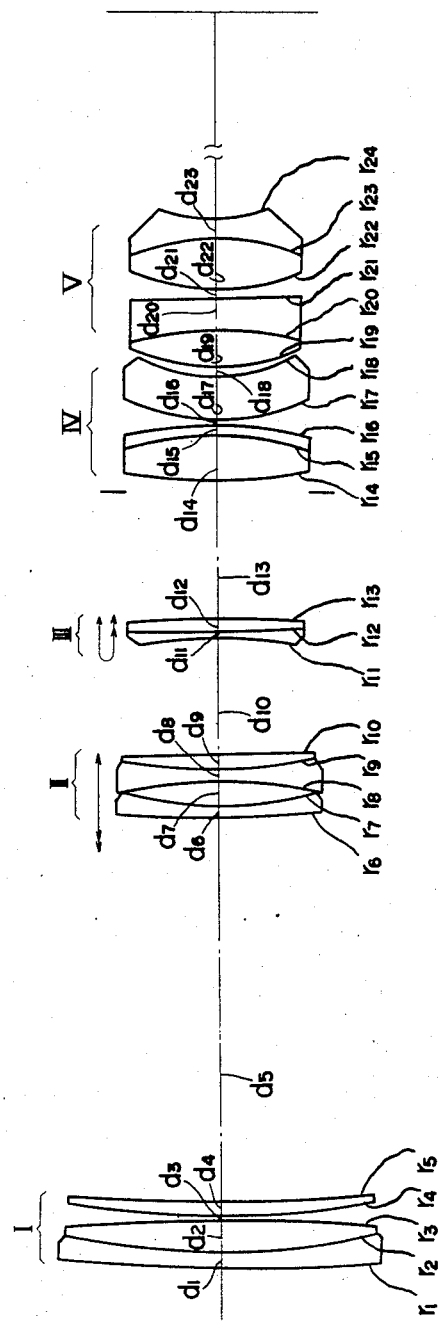
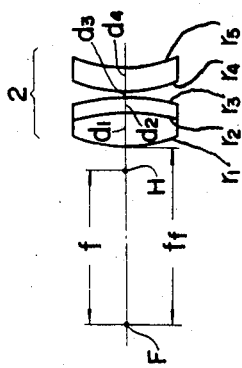
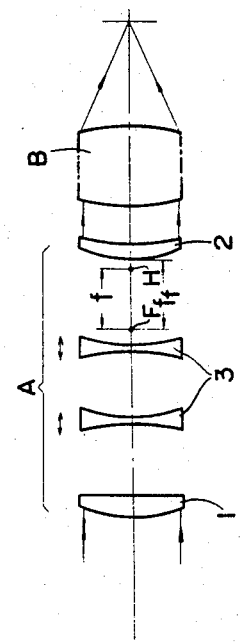
INVENTOR.
EIICHI TAKANO
BY
ATTORNEY

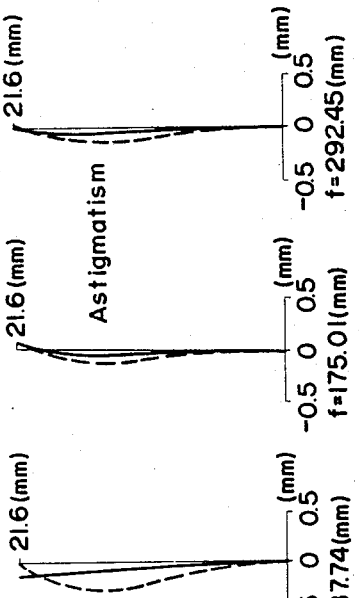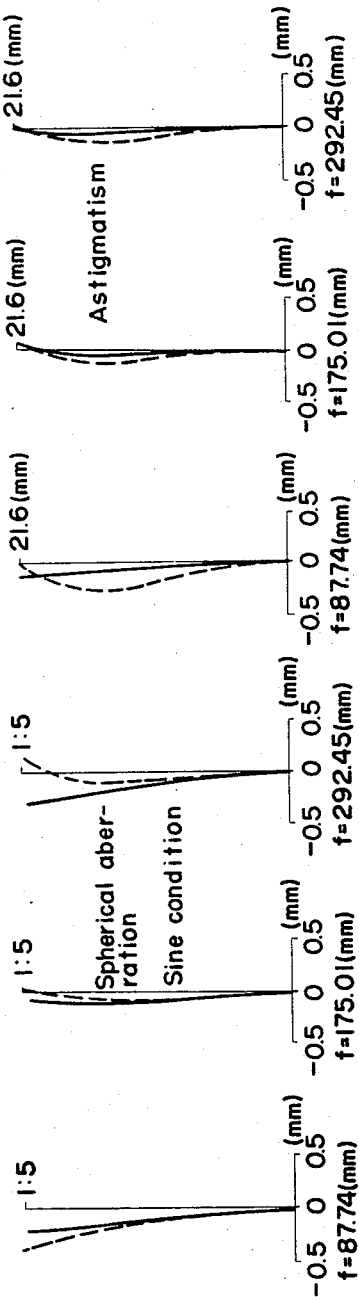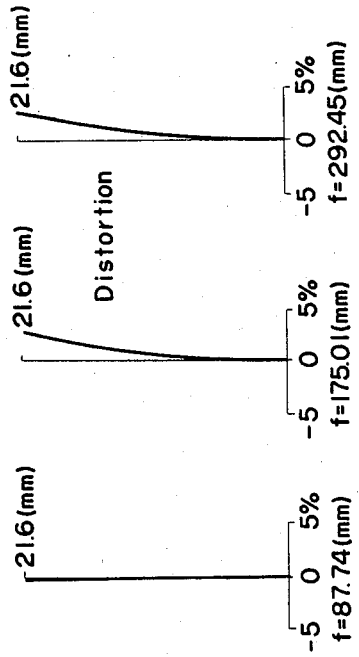

United States Patent Office 3,377,119
Patented Apr. 9, 1968

3,377,119
MECHANICALLY COMPENSATED ZOOM
LENS SYSTEM
Eiichi Takano, Tokyo, Japan, assignor to Canon Camera
Co., Inc., a corporation of Japan
Filed Dec. 30, 1963, Ser. No. 334,386
Claims priority, application Japan, Jan. 21, 1963,
38/1,776; Jan. 25, 1963, 38/2,691
1 Claim. (Cl. 350—184)

The present invention relates to improvements in a zoom lens system comprising a substantially afocal zooming unit of components and a back relay component, the unit comprising a pair of stationary positive components each arranged at either end thereof and a set of intermediate movable components therebetween, the continuous magnification variation being carried out by shifting the movable set.

Conventional photographic zoom lens systems with such arrangement as mentioned above, and having relatively long focal lengths, have not yet been liberated from encumbrances of difficult handling resulting from excess overall physical length of the system. Generally speaking, the overall length of the optical system of a zooming system has much to do with the focal length of its relay component as cooperative member, and when the focal length of the relay compenent is shortened, it becomes theoretically possible to shorten the overall length of the system. But, practically, the shortening of the focal length of the relay component results in the shortening of the overall focal length of the complete system.

Zoom lens systems are apt to become bulky in design, and with the use of doom lenses becoming more general and less regarded as special type of photographic objectives, desires have been more frequently expressed that they should be minimized in weight as well as in size, and that such zooming systems have a long focal length relative to the picture frame and capable of magnification operations which would cover ranges available by present day telephoto lens systems. Now, with such zooming systems being normalized by their focal lengths taken as 1 in numerical value, and the usual short focus systems normalized by their focal lengths taken as 1 in numerical value, the former would in no way be found identical in performance with the latter, unless the former be by far more effectively corrected for aberrations than the latter. Furthermore, the minimization in size and weight and the highly effective correction for aberrations are desires contrary to each other and not satisfiable except with great difficulty. In denoting the functional size of telephoto type objectives, the term of what is called the front telephoto ratio is used, i.e. the ratio of the focal length of the system to the length from the focal surface to the front end surface of the lens system (with zoom lens systems is defined as the ratio of the focal length to the maximum focal length in zooming operation). Other general type telephoto objectives require inventive designs to have the telephoto ratio for a value less than 1 and impose a heavy burden in producing high-quality performance systems. A much heavier burden is imposed in the effort of successfully minimizing the telephoto ratio for zooming systems. With conventional zooming systems, upon exceeding a 2.5 times magnification in zooming, the telephoto ratio could not have been made less than around 1.35 at the minimum.

The afocal continuous magnification unit generally permits reduction in length independently from the magnification ratio in zooming and the overall focal length of the complete system. However, the mere reduction in length of the unit alone results in the deterioration of corrections achieved for aberrations, especially for spherical and comatic aberrations together with the considerable negative sign inclination of the Petzval sum.

The negative or positive sign inclination of the Petzval sum is determined by the arrangement of refractive powers and is not compensated by any bending of the lens element. The reduction in the length from the front end surface of the relay component to the back focal point represents an effective means for rducing the complete system in length. But the use of a telephoto type image formation component for a relay component comprising a member of positive refractive power and another fairly spaced back negative member results in a negative sign inclination of the Petzval sum. The resultant deterioration in aberration corrections attained, makes it unavailable to arrange the entrance pupil for the relay component at a location nearer to object but for the increase in diameter of the front immovable positive component of the continuous magnification variation unit. This is contradictory to an undertaking of minimization in size of the system. With knowledge of such difficulties, there has been no report of the use of a relay component which has a telephoto ratio of less than 1, and it may be said, that one of the main reasons for the non-appearance of a zooming system having a telephoto ratio of less than 1.35 or so, is the fact that the reduction in length of the continuous magnification unit envisages the limitation made by the Petzval sum.

It is one of the objects of the invention to provide a zoom lens system which is reduced in the overall length by use of a short focal length relay component without an attendant reduction in the focal length of the complete zooming system.

It is another object of the invention to provide a zoom lens system suitable for photographic, televisional and other picture taking catagories, which is especially small in size and weight and effectively corrected for aberrations.

It is still another object of the invention to provide a photographic zooming system with a telephoto ratio of the order of 1 present day comparable to the common telephotographic system and which is effectively corrected for aberrations.

Other objects, advantages and features of this invention will become more apparent from the following description of an illustrative embodiment in conjunction with the drawing in which:

FIGURE 1 is a schematic drawing of a photographic zooming system in accordance with the invention;

FIGURE 2 is a schematic drawing of the back immovable positive component of the zooming system of FIGURE 1;

FIGURE 3 is a schematic drawing of a zooming system in accordance with the invention;

FIGURE 4 is a graphic representation of corrections attained for spherical aberrations and the sine condition of the zoom lens system illustrated in FIGURE 3 when the focal length is made the minimum, medium and the maximum;

FIGURE 5 is a graphic representation of corrections attained for astigmatism of the zooming system of FIGURE 3 when the local length is made the minimum, medium and the maximum; and FIGURE 6 is a graphic representation of corrections attained for curvature of the image field of the zooming lens system of FIGURE 3 when the focal length is made the minimum, medium and the maximum.

The invention will be set forth in the following description with references being made to the drawing.

Referring to FIGURE 1, the zooming unit of components is designated at A and the relay component at B. Front positive component 1 and back positive component 2 are immovable whilst intermediate negative components 3 are movable for continuous magnification variation operation. The back immovable positive component 2 has its front focal length $f_t$ longer than its focal length $f$. F denotes the front focal point of the back component 2 and H its front principal point. As referred to above, in a zooming system having a zooming unit with an immovable positive component arranged at either end and movable components 3 therebetween, the reduction of the focal length of the cooperative relay component being used is an effective means for the reduction of the overall length of the system. But it would then result in the reduction of the focal length for the complete system and the necessary reformulation of the system. This is due to the changes in the overall image formation magnification of the relay component and the rear immovable positive component of the zooming unit. In order to avoid reduction of the overall focal length of the complete system irrespective of the reduction introduced for the focal length of the relay component, it is necessary to maintain the unvaried overall image formation magnification throughout and, for this purpose, to reduce the focal length for the back immovable positive component in the same ratio as that for the relay component. On the other hand, in order to successfully arrange the set of components 1, 2 and 3 into a substantially afocal continuous magnification unit, it is necessary to have the image formed of object by components 1 and 3 substantially at front focal point F for back component 3. In conventional such type zooming systems, since the back component, immovable and positive, has the principal point inside the component itself, the reduction of the focal length of lens component 2 results in a mechanical interference with components 3 and the necessary condition referred to above is not secured. In contrast, in accordance with the invention, the use of a back immovable positive component 2 with its front local length $f_t$ longer than its focal length $f$ permits movement of the movable components 3 a sufficient distance permits the focal length of the back fixed positive component 2 to be reduced without fear of the otherwise unavoidable mechanical interference of components 2 and 3 with one another. It is therefore possible to use a short focal length relay component without reducing the overall focal length for the complete system at the same time reducing for the overall physical length. FIGURE 2 represents a most simplified form of design for the back immovable positive component 2 in accordance with the invention with data which follow:

[$f=100$    $f_t=110.54$]

| $r_1=63.38$ | | | |
|---|---|---|---|
| | $d_1=6.19$ | $n_1=1.50137$ | $V_1=56.5$ |
| $r_2=-33.74$ | | | |
| | $d_2=1.28$ | $n_2=1.7552$ | $V_2=27.5$ |
| $r_3=-73.32$ | | | |
| | $d_3=0.07$ | | |
| $r_4=24.38$ | | | |
| | $d_4=6.38$ | $n_3=1.60311$ | $V_3=60.7$ |
| $r_5=20.41$ | | | | where $r_1 \ldots r_5$ denote radii of curvature of elements in seriatim shown in the drawing, $d_1 \ldots d_4$ axial lengths of elements or air spacings for these in seriatim shown in the drawing, $n_1 \ldots n_3$ refractive indices of elements for the $d$ line of spectrum in seriatim shown in the drawing, and $V_1 \ldots V_3$ Abbe's numbers for elements in seriatim shown in the drawing.

A zoom lens system embodying the invention and illustrated in FIGURE 3 comprises the component I, corresponding to the component 1 in FIG. 1, of positive refractive power consisting of a cemented positive doublet and a spaced single positive meniscus with its convex surface toward the object, the component II, corresponding to the left hand lens of the component 3 in FIG. 1, of negative refractive power consisting of a single negative meniscus with its strong concave surface toward the image and a spaced cemented negative doublet, the component III, corresponding to the right hand lens of the component 3 in FIG. 1, consisting of a cemented negative doublet with its concave surface toward the object, the component IV, corresponding to the component 2 in FIGS. 1 and 2, of positive refractive power consisting of a cemented positive doublet and a spaced thick negative meniscus with its strong concave surface toward image and the component V, corresponding to the relay component B in FIG. 1, of positive refractive power consisting of a cemented positive doublet and a spaced cemented negative meniscus doublet with its concave surface toward the image. In the operation for magnification variation, component II is shifted in one direction while component III is shifted in both directions. In other words, when component III is shifted forwardly, the component III is first shifted forwardly and thereafter backwardly.

The air spacings $d_5$, $d_{10}$ and $d_{13}$ are variable corresponding to the changes in the total focal length F and the spacings for minimum (wide angle), medium, and maximum (telephoto) are as follows:

| F=87.74 | 175.01 | 292.45 |
|---|---|---|
| $d_5=1.934$ | 72.172 | 110.615 |
| $d_{10}=113.586$ | 21.262 | 4.954 |
| $d_{13}=2.736$ | 24.871 | 2.736 |

The system satisfies the following conditions, namely (1) $N_2, N_3, N_9, N_{12}, N_{14} < 1.55$
     $N_5, N_6, N_{10}, N_{13} > 1.7$
     $V_2, V_3 > 60$    $V_4, V_5 > 45$    $V_6 < 35$
     $V_2 - V_1 > 30$    $V_5 - V_6 > 25$    $V_7 - V_8 > 20$ where $N_1, N_2 \ldots$ denote refractive indices of elements for the $d$ line of spectrum in arrangement order with respect to object space, $V_1, V_2 \ldots$ Abbe's numbers for elements in seriatim as mentioned;

(2) The length between the front surface and the front focal point of component IV is longer than the focal length for this;

(3) Component V includes a meniscus with its back concave surface having a radius of curvature in the range from $0.055f_{max}$ to $0.085f_{max}$ and an axial thickness in the range from $0.03f_{max}$ to $0.05f_{max}$ (where $f_{max}$ denoting the maximum focal length for the complete system);

(4) Component V of a thick cemented meniscus doublet has its cemented surface, which acts to correct the back concave surface for chromatic aberration, disposed at a portion spaced from this and within one fourth of the full thickness of the component;

(5) Components IV and V are provided with cemented front concave surfaces of positive refractive power and radii of curvature lying in the range from $0.2f_{max}$ to $0.065f_{max}$.

The five conditions above will be further explained as below.

On the condition (1): The selection of refractive indices for elements of positive refractive power in the zooming system, i.e. for $N_2, N_3, N_9, N_{12}$ and $N_{14}$ all to be less than 1.55, and for elements of strong negative refractive power, i.e. for $N_5, N_6, N_{10}$ and $N_{13}$ all to be greater than 1.7, is for the prevention of the Petzval sum becoming negative upon extreme reduction in length of the continuous magnification variation unit consisting of the first to fourth components. Such selection of refractive indices is really contrary to the usual selection for an optical system having a positive focal length and would malinfluence the standing aberration corrections but for any remedy, apart from the Petzval sum. The remedy is the condition:

$V_2, V_3 > 60$    $V_4, V_5 > 45$    $V_6 < 35$
     $V_2 - V_1 > 30$    $V_5 - V_6 > 25$    $V_7 - V_8 > 20$

In producing high performance zooming, it is generally necessary to achromatize independently individual component members of the system. The above condition now makes it possible for component members to be individually achromatized, increased in radius of curvature for cemented surfaces and thereby decreased in axial thickness. Consequently it becomes possible to secure enough space for zooming operation whilst preventing increase in size of the zoomer, and to augment focal lengths for members whilst removing difficulties to a considerable extent to be encountered in correcting for aberrations apart from the Petzval sum.

On the condition (2): The length between the front focal point and the front surface of component IV being longer than its focal length is an item which adds much to the successful reduction in the overall length of the complete system, as noted in connection with FIGURES 1 and 2. This makes it possible to reduce the focal length for component IV, without damaging the condition of the combination of components I to IV as a substantially afocal continuous magnification variation unit and also without introducing mechanical interference between components III and IV in the magnification variation operation. The reduction of the focal length for the relay component without inviting that of the focal length for the complete system requires to hold constant the overall magnification value for components IV and V, which in turn requires that the focal length for component V should be reduced at the same rate as that for component IV. The condition (2) satisfies the requirements. The reduction of the focal length for component V enables the advantageous reduction of the overall length for the complete system.

On the condition (3): The presence in component V of a thick meniscus doublet with a concave back surface of a radius of curvature in the range from $0.055 f_{max}$ to $0.085 f_{max}$ and an axial thickness in the range from $0.03 f_{max}$ to $0.05 f_{max}$, like a back negative component spaced apart from a front positive one in a telephoto type objective, enables the reduction in telephoto ratio exclusively for component V without incurring markable negative sign inclination of the Petzval sum and in the telephoto ratio for the complete system.

On the condition (4): In reducing a zooming system in physical length, it is necessary to minimize its maximum diameter; and in maintaining it constant in relative aperture without change in stop diameter in zooming operation, it is necessary to dispose the stop in the interspace between components III and IV and in the vicinity of the latter. Efforts for simultaneous satisfaction of these requirements and the above cited conditions 2 and 3 may encounter a considerable increase in chromatic aberration ascribable to the thick meniscus doublet in magnification. However, such disadvantageous phenomenon may be effectively avoided by providing component IV with a cemented surface, in its thick cemented meniscus doublet with a back concave surface acting for correction for chromatic aberration, the cemented surface being at a portion within one fourth of the full thickness of the component measured from the back concave surface.

On the condition (5): The satisfaction of the conditions 2 and 3, despite advantages, results in the increment of lateral spherical aberration marring a long focal length zoomer system in performance. This may be effectively avoided by providing components IV and V with cemented concave front surfaces of respectively a radius of curvature in the range from $0.2 f_{max}$ to $0.065 f_{max}$, the difference in refractive index from each other being greater than 0.2.

In FIGURE 3 is shown a zooming system as an illustrative embodiment of the invention.

The focal length of the complete system $f = 87.74$ to 292.45

Relative aperture = 1:5; maximum effective aperture size = 60

Zooming ratio = 3.33; telephoto ratio = 1.0

Back focal length = 108.87

Frame size 24 x 36

The I component:

| | | |
|---|---|---|
| $r_1 = 325.11$ | | |
| $r_2 = 110.53$ $d_1 = 2.0$ | $N_1 = 1.5927$ | $V_1 = 35.4$ |
| $r_3 = -306.48$ $d_2 = 6.7$ | $N_2 = 1.48749$ | $V_2 = 70.0$ |
| $d_3 = 0.1$ | | |
| $r_4 = 166.71$ $d_4 = 2.5$ | $N_3 = 1.48749$ | $V_3 = 70.0$ |
| $r_5 = 355.71$ | | |
| $d_5 = 1.984 - 72.172 - 110.615$ | | |

The II component:

| | | |
|---|---|---|
| $r_6 = 205.45$ | | |
| $r_7 = 77.75$ $d_6 = 1.7$ | $N_4 = 1.713$ | $V_4 = 53.9$ |
| $d_7 = 3.63$ | | |
| $r_8 = -123.15$ $d_8 = 1.7$ | $N_5 = 1.713$ | $V_5 = 53.9$ |
| $r_9 = 76.67$ $d_9 = 2.8$ | $N_6 = 1.80518$ | $V_6 = 25.5$ |
| $r_{10} = 582.435$ | | |
| $d_{10} = 113.586 - 21.262 - 4.954$ | | |

The III component:

| | | |
|---|---|---|
| $r_{11} = -98.4$ $d_{11} = 1.3$ | $N_7 = 1.62041$ | $V_7 = 60.3$ |
| $r_{12} = \infty$ $d_{12} = 2.0$ | $N_8 = 1.62004$ | $V_8 = 36.3$ |
| $r_{13} = -167.876$ | | |
| $d_{13} = 2.736 - 24.871 - 2.736$ | | |

The IV component:

| | | |
|---|---|---|
| $r_{14} = 89.26$ $d_{14} = 8.72$ | $N_9 = 1.50137$ | $V_9 = 56.5$ |
| $r_{15} = -47.52$ $d_{15} = 1.8$ | $N_{10} = 1.7552$ | $V_{10} = 27.5$ |
| $r_{16} = -103.25$ $d_{16} = 0.1$ | | |
| $r_{17} = 34.34$ $d_{17} = 8.98$ | $N_{11} = 1.60311$ | $V_{11} = 60.7$ |
| $r_{18} = 28.75$ $d_{18} = 1.05$ | | |

The V component:

| | | |
|---|---|---|
| $r_{19} = 37.26$ $d_{19} = 6.79$ | $N_{12} = 1.4645$ | $V_{12} = 65.7$ |
| $r_{20} = -76.63$ $d_{20} = 6.08$ | $N_{13} = 1.7552$ | $V_{13} = 27.5$ |
| $r_{21} = -922.7$ $d_{21} = 0.1$ | | |
| $r_{22} = 36.82$ $d_{22} = 10.36$ | $N_{14} = 1.51118$ | $V_{14} = 50.9$ |
| $r_{23} = -31.92$ $d_{23} = 1.94$ | $N_{15} = 1.48749$ | $V_{15} = 70.0$ |
| $r_{24} = 21.70$ | | | where $r_1, r_2 \ldots r_{24}$ denote radii of curvature for refractive surfaces in seriatim shown in the drawing;

$d_1, d_2 \ldots d_{23}$ spacings between refractive surfaces in seriatim shown in the drawing;

$N_1, N_2 \ldots N_{15}$ refractive indices of elements for the d line of spectrum in seriatim shown in the drawing;

$V_1, V_2 \ldots V_{15}$ Abbe's numbers for elements in order of arrangement shown in the drawing.

FIGURES 4 to 6 show corrections for spherical aberrations, sine condition, astigmatism and image distortion as they are seen in the illustrative embodiment of the invention set forth above when this is made to have the minimum, a medium and the maximum focal length. The graphs show the successful corrections attained for every kind of aberration and very small fluctuation, for a zoomer system that commands a substantial focal length available for continuous magnification variation of such values of 3.33 zooming and 1.0 telephoto ratio.

It will be understood that this invention is not limited to the specific materials, figures, etc., and other details described above and illustrated in the drawing, but can be carried out with various modifications without depart-

What is claimed is:
1. Zoom lens system comprising a component I of positive refractive power consisting of a cemented positive doublet and a spaced single positive meniscus with its convex surface toward the object, a component II of negative refractive power consisting of a single negative meniscus with its strong concave surface toward the image and a spaced cemented negative doublet, a component III consisting of a cemented negative doublet with its concave surface toward the object, a component IV of positive refractive power consisting of a cemented positive doublet and a spaced thick negative meniscus with its strong concave surface toward the image, and a component V of positive refractive power consisting of a cemented positive doublet and a spaced cemented negative meniscus doublet with its concave surface toward the image, the component II being movable in one direction while the component III is movable first in the one direction and then in an opposite direction in magnification variation operation, the complete system having the following numerical data:

The focal length of the complete system $f=87.74$ to $292.45$
Relative aperture $=1:5$; maximum effective aperture size $=60$
Zooming ratio$=3.33$; telephoto ratio$=1.0$
Back focal length$=108.87$; frame size$=24 \times 36$ The I component:

| | | |
|---|---|---|
| $r_1=325.11$ | $d_1=2.0$ | $N_1=1.5927$ $V_1=35.4$ |
| $r_2=110.53$ | $d_2=6.7$ | $N_2=1.48749$ $V_2=70.0$ |
| $r_3=-306.48$ | $d_3=0.1$ | |
| $r_4=166.71$ | $d_4=2.5$ | $N_3=1.48749$ $V_3=70.0$ |
| $r_5=355.71$ | $d_5=1.984$-$72.172$-$110.615$ | |

The II component:

| | | |
|---|---|---|
| $r_6=205.45$ | $d_6=1.7$ | $N_4=1.713$ $V_4=53.9$ |
| $r_7=77.75$ | $d_7=3.63$ | |
| $r_8=-123.15$ | $d_8=1.7$ | $N_5=1.713$ $V_5=53.9$ |
| $r_9=76.67$ | $d_9=2.8$ | $N_6=1.80518$ $V_6=25.5$ |
| $r_{10}=582.435$ | $d_{10}=113.586$-$21.262$-$4.954$ | |

The III component:

| | | |
|---|---|---|
| $r_{11}=-98.4$ | $d_{11}=1.3$ | $N_7=1.62041$ $V_7=60.3$ |
| $r_{12}=>$ | $d_{12}=2.0$ | $N_8=1.62041$ $V_8=36.3$ |
| $r_{13}=-167.876$ | $d_{13}=2.736$-$24.871$-$2.736$ | |

The IV component:

| | | |
|---|---|---|
| $r_{14}=89.26$ | $d_{14}=8.72$ | $N_9=1.50137$ $V_9=56.5$ |
| $r_{15}=-47.52$ | $d_{15}=1.8$ | $N_{10}=1.7552$ $V_{10}=27.5$ |
| $r_{16}=-103.25$ | $d_{16}=0.1$ | |
| $r_{17}=34.34$ | $d_{17}=8.98$ | $N_{11}=1.60311$ $V_{11}=60.7$ |
| $r_{18}=28.75$ | $d_{18}=1.05$ | |

The V component:

| | | |
|---|---|---|
| $r_{19}=37.26$ | $d_{19}=6.79$ | $N_{12}=1.4645$ $V_{12}=65.7$ |
| $r_{20}=-76.63$ | $d_{20}=6.08$ | $N_{13}=1.7552$ $V_{13}=27.5$ |
| $r_{21}=-922.7$ | $d_{21}=0.1$ | |
| $r_{22}=36.82$ | $d_{22}=10.36$ | $N_{14}=1.51118$ $V_{14}=50.9$ |
| $r_{23}=-31.92$ | $d_{23}=1.94$ | $N_{15}=1.48749$ $V_{15}=70.0$ |
| $r_{24}=21.70$ | | | where $r_1, r_2 \ldots r_{24}$ denote radii of curvature for refractive surfaces in seriatim from front to rear;
$d_1, d_2 \ldots d_{23}$ spacings between refractive surfaces in seriatim from front to rear;
$N_1, N_2 \ldots N_{15}$ refractive indices of elements for the $d$ line of spectrum in seriatim from front to rear;
$V_1, V_2 \ldots V_{15}$ Abbe's numbers for elements in seriatim from front to rear.

References Cited

UNITED STATES PATENTS 2,847,907  8/1958  Angenieux _____ 88—57
3,074,318  1/1963  Yamaji _____ 88—57

DAVID H. RUBIN, *Primary Examiner.*
JOHN K. CORBIN, JEWELL H. PEDERSEN,
*Examiners.*

UNITED STATES PATENT OFFICE
CERTIFICATE OF CORRECTION

Patent No. 3,377,119                                                     April 9, 1968

Eiichi Takano

It is certified that error appears in the above identified patent and that said Letters Patent are hereby corrected as shown below:

Column 8, component III, "$r_{12}$=<" should read -- $r_{12}=\infty$ --; component V, "$r_{22}$=36.82%" should read -- $r_2$=36.82 --.

Signed and sealed this 2nd day of December 1969.

(SEAL)
Attest:

Edward M. Fletcher, Jr.                                    WILLIAM E. SCHUYLER, JI
Attesting Officer                                                    Commissioner of Patent